A. JOHNSON.
NUT-LOCK.
No. 188,055. Patented March 6, 1877.
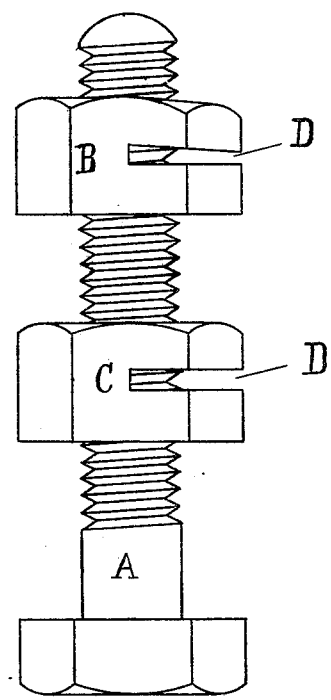

UNITED STATES PATENT OFFICE.

ALONZO JOHNSON, OF SPRINGFIELD, MASSACHUSETTS.

IMPROVEMENT IN NUT-LOCKS.

Specification forming part of Letters Patent No. 188,055, dated March 6, 1877; application filed December 1, 1876.

*To all whom it may concern:*

Be it known that I, ALONZO JOHNSON, of Springfield, in the county of Hampden and State of Massachusetts, have invented a new and useful Improvement in Self-Locking Nuts, which improvement is fully set forth in the following specification, reference being had to the accompanying drawings.

My invention relates to a manner of effecting a permanent change in a portion of the screw-thread in any ordinary nut, whereby the nut is converted into a self-locking nut before it is screwed onto the bolt, the said change in a portion of the screw-thread being such that the larger part of the thread in the nut remaining in the position it was left in by the tap, and such as to permit of its being screwed on and off from a bolt like any ordinary nut, and without the employment of any auxiliary part or parts with said nut to cause it to be locked when on the bolt, or to enable one to unlock it when it is desirable to remove it from the bolt.

In the drawing, A is a bolt. B is one of my improved nuts, screwed on the top end of it. C is a nut, only partly constructed as a self-locking nut, as the upper portion of it is not deflected over the slot. D is a transverse slot, cut in nuts B and C from one side toward the opposite side of the nuts, and extending up to, or beyond, the center of the bolt-holes through the nuts. Said transverse slot D is cut deep enough and wide enough to conveniently allow of setting down that portion of the nuts over the slot sufficiently to throw that part of the screw-thread in the upper semi-detached part of the nuts slightly out of line with the thread in the lower part of the nuts. This causes the nuts to bind very tight on the bolt, and prevents their running back by the action of any shock, trembling, or shaking motion, and they will remain in the position they may be left in by the wrench.

These nuts may be run on and off from a bolt as often as may be required, and still retain their griping qualities.

I am aware that lock-nuts have heretofore been made in which a transverse slot was cut quite across the bolt-hole; but I do not claim that; but What I do claim is—

A nut having a transverse slot in its body in a plane across the bolt-hole, such slot ending within the bolt-hole, and permitting the permanent flexure of the portion of the nut above the slot, as and for the purpose set forth.

ALONZO JOHNSON.

Witnesses:
H. A. CHAPIN,
E. M. SHEPARD.